United States Patent [19]

Natori et al.

[11] Patent Number: 4,808,360

[45] Date of Patent: Feb. 28, 1989

[54] METHOD OF PRODUCING MOLD FOR SLIP CASTING AND METHOD OF MOLDING SLIP CASTING

[75] Inventors: Tatsuo Natori, Kashiwa; Takashi Shimaguchi, Ibaraki; Toshihiro Yamada, Ibaraki; Kazuaki Yokoi, Ibaraki, all of Japan

[73] Assignee: Hitachi, Ltd., Tokyo, Japan

[21] Appl. No.: 43,178

[22] Filed: Apr. 27, 1987

[30] Foreign Application Priority Data

Jul. 28, 1986 [JP] Japan ................................ 61-175622

[51] Int. Cl.$^4$ .......................... B28B 1/26; B28B 7/34; B29C 41/16

[52] U.S. Cl. ...................................... 264/221; 164/36; 249/61; 264/227; 264/317; 264/338; 264/DIG. 44

[58] Field of Search ....... 264/221, 227, 317, DIG. 44, 264/86, 337, 338; 249/61, 62; 164/34–36

[56] References Cited

U.S. PATENT DOCUMENTS

| | | | |
|---|---|---|---|
| 2,420,851 | 5/1947 | Zahn et al. | 164/35 |
| 2,830,343 | 4/1958 | Shroger | 22/196 |
| 3,410,942 | 11/1968 | Bayer | 264/221 |
| 3,946,039 | 3/1976 | Walz | 164/34 |

FOREIGN PATENT DOCUMENTS

| | | | |
|---|---|---|---|
| 0191409 | 8/1986 | European Pat. Off. | 264/317 |
| 61-69436 | 4/1986 | Japan | 264/317 |
| 1308958 | 3/1973 | United Kingdom | 264/221 |
| 1482436 | 8/1977 | United Kingdom . | |

*Primary Examiner*—Jay H. Woo
*Assistant Examiner*—James C. Housel
*Attorney, Agent, or Firm*—Antonelli, Terry & Wands

[57] ABSTRACT

A mold forming method in which a pattern is made of an organic material such as foamed polystyrene and at least a portion of the outer or inner surface of the mold pattern is covered by a thin coating, and surrounded with a mold material. The pattern is then dissolved by a solvent, leaving the coating undissolved. The coating is finally removed by a solvent contained in a slip which is poured into the cavity provided with the coating.

29 Claims, 6 Drawing Sheets

METHOD OF PRODUCING MOLD FOR SLIP CASTING AND METHOD OF MOLDING SLIP CASTING

BACKGROUND OF THE INVENTION

1. Field of the Invention

The present invention relates to a method of producing a slip casting mold which is used to fabricating formed articles by casting from a slip which contains, for example, ceramic powders, metal powders and carbon powders, and also to a slip casting method using the mold. More particularly, the present invention is concerned with a method of producing a slip casting mold which is used in molding of articles which necessitate cores and mold parts having such complicated configurations that they cannot be extracted due to inverse tapers, as well as to a slip casing method making use of such a casting mold.

2. Description of the Prior Art

In casting articles having complicated outer and inner configurations from a mold, it has been a common measure to form the mold by assembling a multiplicity of main mold parts and cores. This method, however, requires a number of steps for the preparation of many mold parts and cores. In addition, the quality of the products tends to be impaired due to the presence of burrs.

A method for overcoming these problems is disclosed in the specification of British Patent No. 1482436. According to this method, mold parts having complicated configurations are formed from an organic material, while other mold parts of comparatively simple configurations are formed from gypsum. As a slip is poured into a resultant mold, the gypsum absorbs the water contained in the slip to solidify the slip. Thereafter, the organic material is dissolved by a solvent, whereby a wet shaped body generally referred to as a "green body" is obtained.

This method, however, suffers from the following disadvantages.

(i) Dissolved residue of organic material inevitably remains locally on the surface of the green body. The more complicated the article configuration, the more difficult the removal of the dissolved residue. The dissolved residue remaining on the product surface due to incomplete removal or due to penetration into the green body seriously deteriorates the quality of the product.

(ii) An impractically long period of time is required for solidification of the green body, because only a limited portion of the mold can absorb water.

The specification of U.S. Pat. No. 2,830,343 discloses a method in which a pattern made of foamed polystyrene is embedded in molding sand. As a molten metal is poured into the mold as it coexists with the pattern, the pattern is melted by the heat of the molten metal, so that the space which has been occupied by the pattern is replaced by the molten metal. This method is generally called a full-mold casting method. Considering that the removal of the pattern and the substitution by the molten metal have to be conducted simultaneously, it would be very difficult to apply the full-mold casting method to slip casting.

Thus, the method disclosed in the specification of British Patent No. 1482436 is disadvantageous in that the dissolved residue of organic material remains on the surface of the green body. As explained before, the more complicated the article configuration, the more difficult the removal of the residue. Any residue remaining on the surface of the green body due to incomplete removal or any fraction of the residue penetrated into the green body impairs the quality of the product. Furthermore, a high degree of skill and experience, as well as a number of steps, are required for the assembly of the mold from many mold parts and cores.

On the other hand, the application of the full-mold method disclosed in the specification of U.S. Pat. No. 2,830,343 to slip casting is considered to be difficult in view of the fact that the removal of the pattern and the substitution by the molten metal have to be conducted simultaneously.

OBJECT OF THE INVENTION

Accordingly, an object of the present invention is to readily provide an integrated mold suitable for use in obtaining an article with a complicated configuration by slip-casting.

Another object of the present invention is to provide a method of forming an integrated mold which is suitable for use in slip casting for the production of an article having both a complicated outer configuration and a complicated shape of internal cavity, without any dissolved residue of pattern material on the surface of the mold cavity.

Still another object of the present invention is to provide a method of producing a mold which can completely prevent the crack of a green body from occurring due to core constraint attributable to drying shrinkage of the green body.

A further object of the present invention is to provide a method for conducting slip casting to obtain an article by making use of a mold having the features set forth above.

SUMMARY OF THE INVENTION

According to the invention, the usual steps for obtaining a product by slip casting are as follows:

(1) preparing a pattern;
(2) providing a mold (forming a cavity);
(3) casting a slip;
(4) solidifying the slip (a liquid medium contained in the slip is absorbed in mold walls so that a green body is obtained;
(5) removing the mold (the green body is obtained); and
(6) sintering the green body.

With the exception of a case of a product having such simple shape as a plate-like shape, straight shape etc., there are existed problems in the steps 2 (the providing of the mold), 4 (the solidification of the slip) and 5 (the removing of the mold) when obtaining a product having a reversed taper or having many three-dimensional, convex and concave portions (described hereinafter as "complicated shape product"), and it has been desired to discover measures to overcome the problems. That is, when molding a complicated shape product, it is first necessary to provide a mold cavity of a complicated shape. For preparing the mold cavity of complicated shape, it has been necessary to use many main molds and cores because of the following reasons:

(a) Unless assembling many mold portions (main molds and cores), it is impossible to provide a mold cavity of a complicated shape (regarding the above-described mold-forming step 2);

(b) A green body is apt to suffer stress from both the rigid cores and main molds with the result that cracks are apt to occur in the green body, during the solidification of the slip and during the shrinkage of the green body caused due to the removing of water and due to drying of the green body (the step 4 of solidifying the slip); and (c) In order to remove a mold without causing flaws on the green body after the green body is prepared by the solidifying of the slip, the mold must be divided into many mold portions because the strength of the green body is very low in comparison with the mold, that is, the strength of the green body is not more than one fifth that of the mold (the step 5 of removing the mold).

The invention simultaneously alleviates the problems (a), (b) and (c) which have been caused in conventional slip casting methods of producing a product of a complicated shape. That is, in the present invention it is possible to use a single integrated mold even if the mold has a cavity complicated in shape. Since the mold has already lost strength for integration after the forming of the mold and before the casting of the slip or since the mold loses the strength for integration as the mold absorbs a solvent contained in the slip, a resultant green body receives no stress during the drying and shrinking thereof, with the result that no cracks occur.

Since, in any case, the strength for integrating the mold is lost after the green body is formed, it is very easy to remove the mold. Thus, the green body is separated from the mold while having a good state without flaws.

Next, the invention is exemplified by showing specific steps.

First, there is prepared a pattern of foamed polystyrene having the same shape as that of a product to be produced (the dimensions of the pattern are made to be somewhat larger to compensate shrinkage caused during the solidification of the slip), onto the surface of which pattern is formed a coating of polyvinyl alcohol. Then, the pattern is embedded in a thermally collapsing mold slurry (consisting of $\alpha$-gypsum of 30 parts by weight, $SiO_2$ fine powder of 70 parts by weight, and water of 50 parts by weight), and the mold slurry is solidified.

After that, trichloroethane is poured through a pouring gate to thereby dissolve the pattern, and the dissolved pattern is discharged outside of the mold. Since the coating is insoluble in the trichloroethane, the coating remains on the inner wall of the mold. Then, by heating the mold (at 300° C. for about 2 hours), the strength of the mold is decreased substantially to have a value less than 1 $Kg/cm^2$ due to the characteristics of gypsum, while the coating burns out due to the heating. Then, by pouring in the mold cavity a ceramic slip containing water as a solvent, the water in the slip is absorbed in the mold, the slip being gradually solidified to form a green body. In this case, since the strength of the mold becomes very low, no cracks are caused in the green body and in addition the mold is readily removed, with the result that a good green body can be obtained.

According to a first aspect of the present invention, there is provided a method of producing a mold for slip casting comprising the steps of: preparing a pattern made of an organic material soluble in a predetermined solvent A which coating is impermeable to the solvent A; filling an area surrounding the pattern with a molding material containing a binder soluble to still another predetermined solvent C; making the solvent A contact with the pattern so as to contract or dissolve the pattern; and removing the material of the pattern to the outside of the molding material thereby forming a mold cavity.

According to a second aspect of the present invention, there is provided a method of producing a mold for slip casting comprising the steps of: preparing a pattern made of an organic material soluble in a predetermined organic solvent; covering at least a portion of the surface of the pattern with a coating soluble in water but insoluble in the organic solvent; filling an area surrounding the pattern with a molding material containing a binder soluble in water; making the organic solvent contact with the pattern so as to contract or dissolve the pattern; and removing the material of the pattern to the outside of the molding material thereby forming a mold cavity.

According to a third aspect of the present invention, there is provided a method of producing a mold for slip casting comprising the steps of: preparing a pattern of female type made of an organic material soluble in a predetermined solvent A; covering at least a surface of a recess formed in the female-type pattern with a coating soluble in another predetermined solvent B but insoluble in the solvent A; filling the recess provided in the female type pattern with a molding material containing a binder soluble to still another predetermined solvent C; making the pattern contact with the solvent A so as to contract or dissolve the pattern; and removing the material of the female type pattern thereby forming a male-type mold.

A fourth and fifth aspect of the present invention relates to slip casting methods. In the slip casting method of the fourth aspect, the solvent B is poured into the mold cavity formed by the method of the first aspect of the invention so as to dissolve the coating, then a slip containing the solvent C is poured into the mold cavity, the slip being solidified while making the mold material easily collapsible, and a solidified slip product being obtained while collapsing and removing the mold. In the slip casting method of the fifth aspect, a slip containing water is poured into the mold cavity formed by the method of the second aspect of the invention so as to dissolve the coating and to solidify the slip while making the mold material easily collapsible, a solidified slip product being obtained thereafter while collapsing and removing the mold.

A sixth aspect of the invention relates to a method of producing a mold used for slip casting. In the method, at least a part of the surface of a pattern made of an organic material soluble in a predetermined solvent A is covered with a coating soluble in a predetermined solvent A and insoluble in the solvent A which coating is not permeable to the solvent A. Then, an area surrounding the pattern is filled with a slurry comprising an inorganic powder as an aggregate, gypsum as a binder, and water and preferably with a mold material the strength of which decreases substantially when it is heated. Next, the solvent A is made to contact with the pattern so that the pattern shrinks and/or is dissolved in the solvent, the pattern being then discharged outside of the mold so as to form a mold cavity. After completing the casting of the slip, the strength of the mold is decreased preferably by heating the mold.

By casting a slip containing water or ethyl alcohol or acetone as a solvent into the cavity of the mold obtained in accordance with the sixth aspect of the invention, it is also possible to solidify the slip. In this case, after the slip is solidified to become a green body, the mold is removed. Since the strength of the mold decreases substantially, the mold can be readily removed from the green body.

(Mold pattern)

The pattern used in the second, fourth and sixth aspects of the invention is preferably formed from a foamed plastic compact which is easily soluble to the solvent A. On the other hand, the pattern used in the first, third, fifth and seventh aspects of the invention is preferably made of a foamed plastic compact which is easily soluble to organic solvents. More preferably, the material of the pattern is selected from a group consisting of foamed polystyrene, foamed polyethylene and p-dichlorobenzene.

(Solvent for dissolving the pattern)

Any solvent which is capable of dissolving the pattern may be used as the solvent A. Preferably, the solvent A is one organic solvent selected from a group consisting of trichloroethane, trichloroethylene, tetrachloroethylene, methyl ethyl ketone, toluene and ethyl acetate or is a mixture of two or more of these substances. When the mold pattern is made of foamed polyethylene, trichloroethylene or trichloroethane or methyl ethyl ketone is suitably used, whereas, when p-dichlorobenzene is used as the pattern material, toluene is used suitably as the solvent. Tetrachloroethylene and ethyl acetate dissolve styrene very well, but the use of ethyl acetate requires much attention because it easily catches fire.

(Solvent capable of dissolving coating)

The material of the solvent B which is used as a solvent of the slip can conveniently be selected from a group consisting of water, alcohol and acetone. In view of the fact that most of the solvents of the slip is water, most of the coatings are soluble in water.

(Solvent capable of dissolving binder contained in the mold material)

In order to a simplify the slip casting process it is preferred that the solvent C is the same kind as that of the solvent B, particularly, water. Thus, the material of the solvent C is selected from the group consisting of water, alcohol and acetone.

When the coating material is starch, trichloroethane as a solvent A, water as the solvent B and acetone as the solvent C are conveniently used in combination. In this case, the acetone which is the solvent C is also a solvent of the slip. When the coating material is polyvinyl alcohol, a suitable combination of solvents is, for example, trichloroethane as the solvent A, water as the solvent B and ethyl alcohol as the solvent C.

Incidentally, the use of a binder capable of being dissolved by the solvent, which binder is contained in a mold material, is not a requisite indispensable to the invention. For example, a "heat-collapsing mold" may be used which is made of a slurry prepared by adding inorganic fine powder, such as $SiO_2$ powder, etc., in gypsum and then by adding a predetermined amount of water thereto.

(Coating)

The material of coating varied depending on the solvent. In case of a water-soluble coating, the coating material suitably used in an aqueous solution of one or more materials selected from the group consisting of polyvinyl alcohol (PVA), water-soluble isobutane-maleic anhydride copolymer, polyacrylamide (PAAm), polyethylene oxide (PEO), polyvinyl pyrrolidone (PVP), water-soluble vinyl acetate copolymer, acrylic copolymer, polyethylene glycol (PEG), methyl cellulose (MC) carboxy methyl cellulose (CMC), hydroxypropyl cellulose (HPC), water-soluble was, starch, glue and gum arabic. For example, since polyvinyl alcohol (PVA) is soluble both in water and alcohol (, e.g., ethanol), PVA can be used suitably when the solvent B is water or alcohol. The coating is formed by applying a thin layer of the coating material substantially uniformly on the outer or inner surface of the pattern. The application is preferably conducted by means of a brush, spray or spinner. The thickness of the coating finally ranges between 5 and 100 μm, preferably between 5 and 30 μm. Any thickness variation due to pattern configuration or location of the application is permissible.

(Water-soluble mold binder)

Both an organic binder and an inorganic binder are usable. Examples of water-soluble inorganic binder are a carbonate such as sodium carbonate ($Na_2CO_3$) and potassium carbonate ($K_2CO_3$); a chloride such as sodium chloride (NaCl), potassium chloride (KCl), magnesium chloride ($MgCl_2$) and lithium chloride (LiCl); a phosphate such as trisodium phosphate ($Na_3PO_4$), tripotassium phosphate ($K_3PO_4$) and dipotassium hydrogen phosphate ($K_2HPO_4$); and a sulfate such as magnesium sulfate ($MgSO_4$), potassium sulfate ($K_2SO_4$), sodium sulfate ($NA_2SO_4$), aluminum sulfate ($Al_2SO_4$) and ammonium sulfate ($NH_2SO_4$), One, two or more of these binder materials are used in the form of an aqueous solution.

Examples of the water-soluble organic binder are polyvinyl alcohol (PVA), water-soluble isobutane-maleic anhydride copolymer, polyacrylamide (PAAm), polyethylene oxide (PEO), polyvinyl pyrrolidone (PVP), water-soluble vinyl acetate copolymer, acrylic copolymer, polyethylene glycol (PEG), methyl cellulose (MC), carboxy methylcellulose (CMC), hydroxypropyl cellulose (HPC), water-soluble wax, starch, glue and gum arabic. One, two or more of these binder substances are used in the form of an aqueous solution.

The mold binder is not necessarily limited to a water-soluble material. For instance, it is possible to use a binder which is soluble to alcohol, e.g., an alcohol solution of polyvinyl alcohol (PVA). Thus, polyvinyl alcohol is usable either in the form of an aqueous solution or an alcohol solution.

BRIEF DESCRIPTION OF THE DRAWINGS

FIGS. 1 to 7 illustrate steps of a method in accordance with the first embodiment of the invention in which:

FIG. 1 is an illustration of a pattern;

FIG. 2 is an illustration of the pattern after formation of a coating;

FIG. 3 is an illustration of a step after filling with a mold material;

FIG. 4 is an illustration of a step in which the pattern is being dissolved;

FIG. 5 is an illustration of a mold after removal of the pattern;

FIG. 6 is an illustration of a step of casting a slip; and

FIG. 7 is a sectional view of a green body obtained.

FIGS. 8 to 12 illustrate steps of another method in accordance with a second embodiment of the invention in which:

FIG. 8 is an illustration of a pattern after formation of a coating thereon;

FIGS. 9 and 10 are illustrations of a step after filling with a mold material;

FIG. 11 is an illustration of a step of dissolving the pattern; and

FIG. 12 is an illustration of a step after dissolving the pattern.

FIGS. 13 to 19 illustrate steps of still another method in accordance with a third embodiment of the invention in which:

FIG. 13 is an illustration of the state after filling with a mold material;

FIGS. 14 to 18 are illustrations of steps of dissolving a pattern, contraction of the pattern, and removal of dissolved residue; and FIG. 19 is a sectional view of a resultant mold.

FIGS. 20 to 23 are illustrations of steps of still another method in accordance with a fourth embodiment of the invention in which:

FIG. 20 is an illustration of a pattern of a female type;

FIG. 21 is an illustrate of the pattern provided with coating;

FIG. 22 is an illustration of a mold material filled in the pattern; and

FIG. 23 is an illustration of a step of dissolving the pattern.

FIGS. 24 and 25 are illustrations of steps of still another method in accordance with a fifth embodiment of the invention in which:

FIG. 24 is a sectional view of a pattern made of foamed styrene and having a configuration corresponding to that of a turbo-charger casing; and FIG. 25 is an illustration of the appearance of a sintered product of a turbo-charger casing made of silicon nitride.

FIGS. 26 to 29 are illustrations of steps in a sixth embodiment of the president invention in which:

FIG. 26 is a sectional view of a pattern made of foamed styrene and having a configuration corresponding to that of a screw rotor;

FIG. 27 is a sectional view of the pattern embedded in a mold material;

FIG. 28 is a sectional view of the mold after removal of the foamed styrene; and FIG. 29 is a sectional view of the mold illustrating the pouring of a slip into the mold cavity.

FIGS. 30 and 31 are illustrations of steps of a method in accordance with a seventh embodiment of the invention in which:

FIG. 30 shows the appearance of a pattern made of foamed styrene and having a configuration corresponding to that of a casing; and FIG. 31 is an illustration of the pattern embedded in a mold material.

(FIRST EMBODIMENT)

The method of producing a slip casting mold in accordance with a first embodiment has the steps of: preparing a pattern made of an organic material soluble to a solvent, e.g., a foamed styrene; forming on the surface of the pattern a coating soluble in water but not soluble to the solvent; filling an area surrounding the pattern with a mold material collapsible by water; hardening the mold material; dissolving the pattern by the solvent capable of completely dissolving the pattern; and removing the pattern to form a mold cavity.

Figure 1:
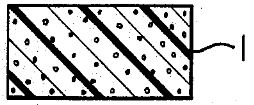

That is, the method of this embodiment is carried out in accordance with the following procedure;

(1) A pattern 1 (see FIG. 1) was formed of a resin (, for example foamed styrene) soluble to a solvent.

Figure 2:
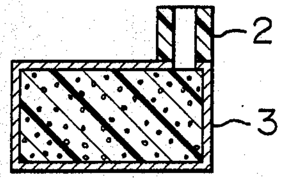

(2) A cylindrical sprue 2 (see FIG. 2) made of a material which does not absorb water, e.g., vinyl chloride, was bonded to the mold pattern 1, and a material soluble in water but not soluble in the solvent was coated onto the surface of the mold pattern to a thickness of 5 to 110 μm, preferably 5 to 30 μm, thus forming a coating 3. The coating was then dried.

Figure 3:
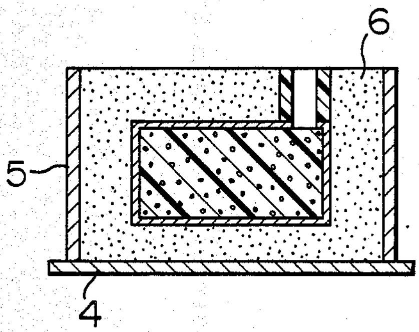

(3) A flask 5 was placed on a molding board 4 and the pattern was placed in the flask. Then, a water-collapsible sand 6 containing a powder which is hardly soluble in water such as a refractory powder with a water-soluble binder dispersed therein was filled around the pattern 1 as shown in FIG. 3.

Figure 4:
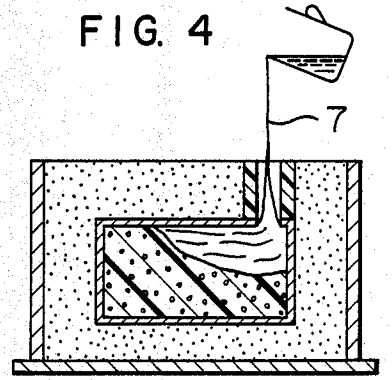

(4) A solvent 7 such as trichloroethane capable of dissolving the pattern material was poured through the sprue 2 as shown in FIG. 4, thereby dissolving the pattern 1. After the pattern was dissolved apparently completely, the solution of the solvent 7 and the pattern material dissolved therein was removed to the outside of the mold. If there is any residue of the pattern material on a portion of the wall surface of the mold, the solvent 7 be charged again to completely remove the residue, as shown in FIG. 4. It is to be noted that the material of the coating 3 is not at all soluble in the solvent which is used for dissolving the pattern material, so that the solvent does not penetrate into the mold. Therefore, the removal of the pattern is possible merely by using only a small amount of solvent corresponding to the volume of the pattern. The solution of the solvent 7 and the material of the pattern 1 dissolved therein cannot penetrate into the mold, so that the water-absorbability of the mold sand is not impaired.

Figure 5:
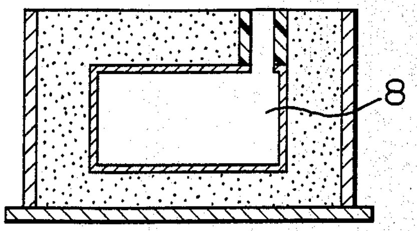

(5) A mold cavity 8 having the same configuration as the pattern 1 was formed by these steps, as shown in FIG. 5.

Figure 6:
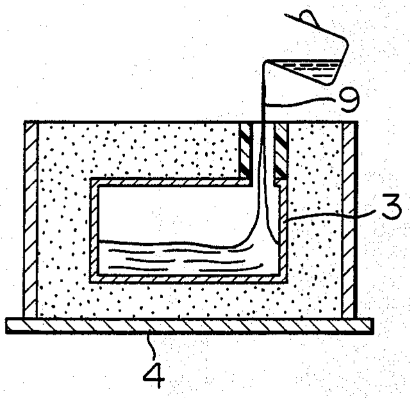

(6) A ceramic slip 9 was prepared by mixing a ceramic powder with water, and the thus prepared slip 9 was poured into the mold cavity 8 as shown in FIG. 6. Since the coating 3 is soluble in water and is permeable to water, the water in the slip 9 was progressively absorbed into the water-collapsible mold 6. In consequence, the slip 9 was solidified to form a green body. In addition, the adhesion between particles of the mold was then decreased so that strength of the mold was reduced to a level which is 1/10 to 1/20 of the initial strength. This tendency was greater in the region closer to the green body.

Figure 7:
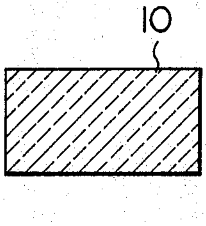

(7) After the solidification of the slip, the green body 10 was taken out of the mold 6 as shown in FIG. 7. This was conducted very easily because the mold 6 became very low in strength. Finally, the green body 10 was sintered under a predetermined condition so as to form a complete sintered ceramic product.

Although the illustrated embodiment employs a pattern of a simple configuration, the advantage of this embodiment is more remarkable when applied to the molding of articles having complicated configurations. Namely, since mechanical removal of the pattern is unnecessary in any case of producing a product having a remarkably complicated shape, it is possible to easily form an integrated mold, so that troublesome works required in conventional methods such as preparation and assembly of a number of mold parts and cores are completely unnecessary in the present invention.

It is to be noted also that, since the mold becomes soft as a result of absorption of water as explained in step (6), the green body of ceramic is not constrained by a mold part, particularly by a core, when the green body of the ceramic contracts due to the decrease if water contained therein. It is therefore possible to completely prevent the green body from being cracked even when it has a complicated configuration having an internal cavity therein.

The described embodiment can be applied not only to the slip casting of ceramics but also to the slip casting of metal or resin powders, and there will be obtained the same advantageous effect as that obtained in the production of ceramic products if water is used as a liquid medium of the slip.

(SECOND EMBODIMENT)

Figure 8:
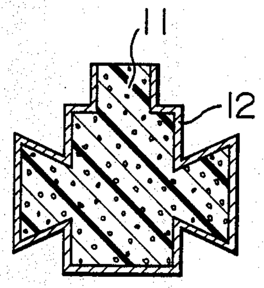
Figure 10:
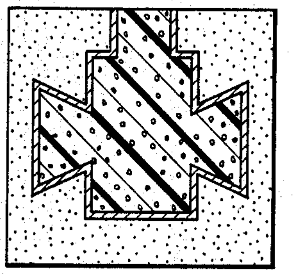
Figure 11:
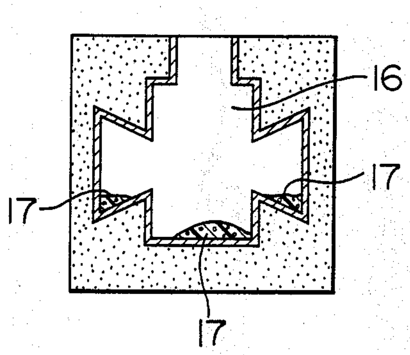

An aqueous solution of 15% polyvinyl alcohol was applied onto the whole surface of a foamed polystyrene test piece 11 (foaming magnification of 40 times) shown in FIG. 8 with the exception of the upper end, so as to form a coating 12 of about 50 μm in thickness. The test piece was fixed in the center of a wooden flask 14 placed on a molding board 13, and a slurry of kneaded mixture of 100 parts by weight of gypsum and 60 weight parts of water was poured around the test piece 11. Two molds having the foamed styrene test piece 11 embedded therein were thus prepared. The molds were then turned upside down and the boards 13 and the flasks 14 were removed as shown in FIG. 10. Acetone was charged into the pattern test piece 11 in the first mold from the top thereof having no coating of polyvinyl alcohol. In this case, the pattern was dissolved quickly but a large quantity of dissolved residue 17 remained on the surface of the mold, particularly on the bottom. Thus, acetone seems to contract the pattern rather than to dissolve the same.

Figure 12:
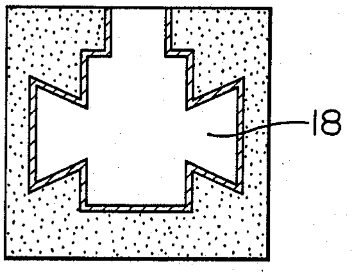

Regarding the second mold, trichloroethane was charged from the top of the pattern test piece. In this case, the pattern was progressively dissolved, so that a mold cavity 18 having no dissolved residue was obtained as shown in FIG. 12 after the removal of the solution composed of trichloroethane and the pattern material. It was thus possible to obtain a water-collapsible mold having a desired mold cavity having no dissolved residue at all by providing a coating of a water-soluble and solvent-insoluble material on the pattern surface and by using trichloroethane as the solvent for dissolving the pattern material.

| Mold No. | Pattern dissolving solvent | Adhesion of dissolved residue onto inner wall of mold | Evaluation |
|---|---|---|---|
| First Mold | Acetone | Residue found particularly on the bottom of mold cavity | good |
| Second Mold | Trichloroethane | No residue (polystyrene completely dissolved in the solvent) | Excellent |

Thus, the use of acetone as the solvent is not preferred because it only causes the pattern to be contracted, necessitating troublesome steps for the removal of the dissolved residue or contracted pattern. However, in the present invention, it is possible to satisfactorily adopt the combination of contraction and dissolution as in the following embodiment.

(THIRD EMBODIMENT)

Figure 13:
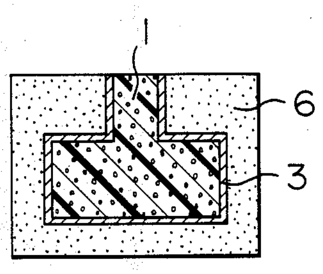
Figure 17:
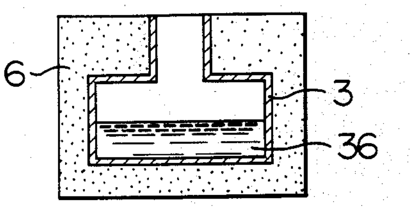
Figure 14:
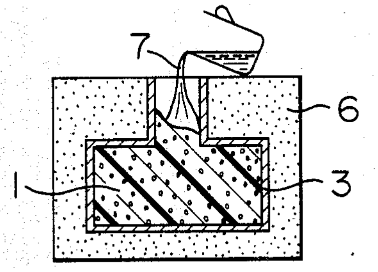
Figure 18:
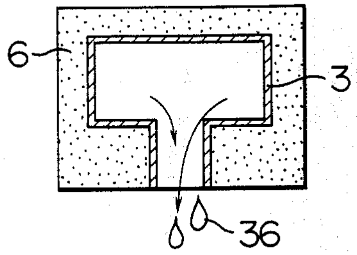
Figure 15:
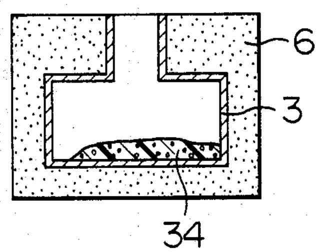
Figure 19:
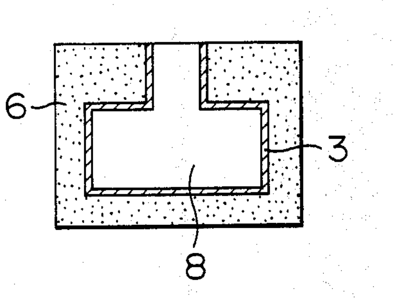
Figure 16:
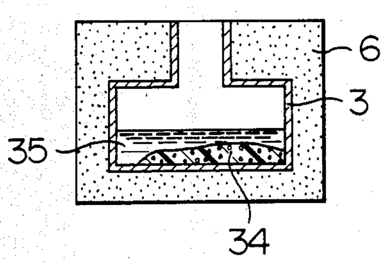

As shown in FIGS. 13 to 19, this embodiment makes use of contraction of the pattern by the use of acetone. As the first step, a coating 3 was formed on the pattern 1 of foamed polystyrene in the same manner as that in the second embodiment, and a mold material 6 is filled around the pattern 1 as shown in FIG. 13. Then, acetone was poured to the mold pattern 1 so that the pattern 1 is seemingly contracted as shown in FIG. 14, leaving both acetone and contracted body as residue 34 on the bottom of the cavity formed in the mold, as shown in FIG. 15. Then, trichloroethane 35 was poured as shown in FIG. 16 into the cavity so that a homogeneous solution 36 was formed in the cavity as shown in FIG. 17. Then, the solution was discharged to the outside of the mold as shown in FIG. 18 whereby a mold of this embodiment was completed as shown in FIG. 19.

Acetone can dissolve polystyrene but the degree of magnitude of the dissolving is very small as compared with trichloroethane and trichloroethylene, with the result that the polystyrene pattern is merely seemingly contracted into a shape like a rice cake in a case of using acetone. In contrast, trichloroethane or trichloroethylene can completely dissolve the polystyrene pattern to thereby provide a homogeneous solution. It is, therefore, advisable to provide such a homogeneous solution and then to discharge the solution to the outside of the mold.

(FOURTH EMBODIMENT)

Figure 20:
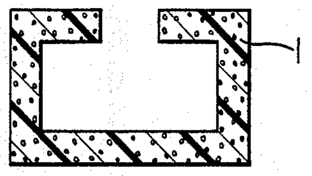
Figure 21:
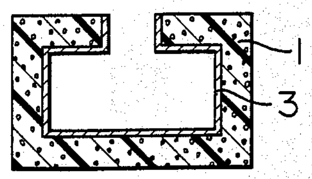
Figure 22:
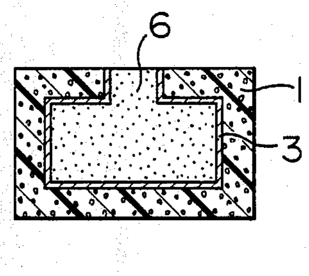
Figure 23:
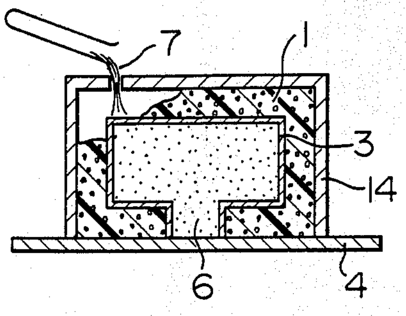

As will be seen from FIGS. 20 to 23, the fourth embodiment relates to the formation of a mold core. Thus, the pattern used in the initial step was a female-type pattern as shown in FIG. 20. More specifically, as the first step, the female-type pattern was prepared as shown in FIG. 20 which is made of foamed polystyrene, and a coating was provided on the inner surface of the pattern as shown in FIG. 21. Subsequently, the cavity of the pattern was filled with a mold material shown in FIG. 22, the pattern being then dissolved by a suitable solvent as shown in FIG. 23 after the hardening of the mold, whereby a mold of this embodiment was obtained.

(FIFTH EMBODIMENT)

Figure 24:
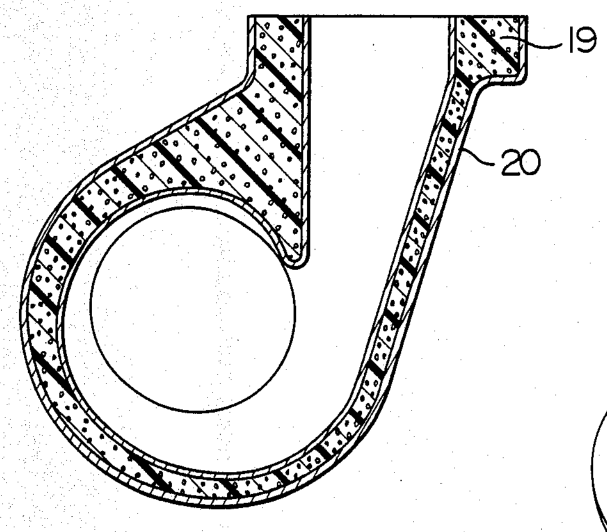

A pattern 19 was formed by use of foamed polystyrene into a shape identical to that of an automotive turbo-charger casing, as shown in FIG. 24. The volume of the pattern was 200 $cm^3$, while the foaming magnification of the polystyrene was 20 times. Then, an aqueous solution of 15% polyvinyl alcohol was applied onto the surface of the pattern 19 and then dried so as to form a coating 20 of about 50 μm in thickness.

The pattern was placed on a molding board in the same manner as in the first embodiment. A molding sand was prepared by kneading both 100 parts by weight of alumina (350 to 325 mesh) and 35 parts by weight of aqueous solution of 8% polyvinyl alcohol, and then the area surrounding the polystyrene pattern is filled with the molding sand to embed the pattern. The formed mold was turned upside down after tamping the sand. Then, a predetermined amount of trichloroethane was charged in a sprue portion of the pattern where there is provided no coating, after removal of the wooden flask and the molding board. The pattern 19 was quickly dissolved from the upper side thereof as a result of contact with trichloroethane. Then, the trichloroethane solution with polystyrene dissolved therein was discharged to the outside of the mold by means of a hand pump.

The mold thus formed was then placed in an electronic over so as to be irradiated with microwaves for 10 minutes for drying and curing the mold. As a result, a mold was formed to have a required mold cavity with a smooth wall surface having no pattern residue at all and with a high dimensional precision.

An $Si_3N_4$ slip was prepared which comprises $Si_3N_4$ powder of mean particle size of 0.5 μm as a main constituent thereof, a deflocculation agent, a binder, and distilled water. The slip was poured into the cavity of the mold and the mold was collapsed after elapse of two hours, while confirming the hardening of the green body. In order to promote the collapse of the mold, water was sprayed onto the mold, so that the mold material could be removed very easily, whereby a green body of $Si_3N_4$ with highly smooth surface with no burr and having a high dimensional precision was obtained.

Figure 25:
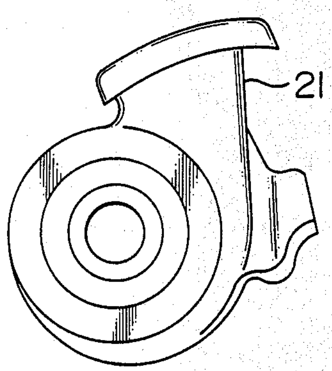

The green body was placed in a nitriding furnace and was gradually heated up from room temperature and maintained at 1850° C. for 2 hours followed by slow cooling. As a result, a turbo-charger casing 21 as a complete sintered product of $Si_3N_4$ having a high density was obtained as shown in FIG. 25.

(SIXTH EMBODIMENT)

Figure 26:
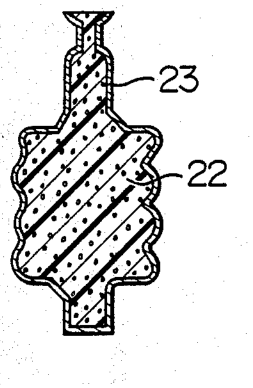

A pattern 22 was formed by use of foamed polystyrene (forming magnitude of 20 times) into a shape identical to that of a male type rotor of a screw compressor, as shown in FIG. 26. Then, an aqueous solution of 15% polyvinyl pyrrolidone was applied onto the surface of the pattern 22 except for the top surface thereof so as to form a coating 23 of about 50 μm in thickness.

Figure 27:
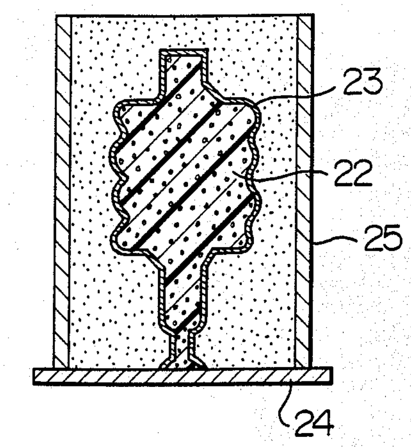

The pattern was placed on a molding board 24 in the same manner as the first embodiment as shown in FIG. 27 and a sprue was bonded by an adhesive to the pattern. The pattern was then surrounded by a wooden flask 25. A molding sand was preparing by kneading 100 parts by weight of alumina (250 to 325 mesh) and 40 parts by weight of aqueous solution of 1.7% carboxy methyl cellulose (CMC), and the area surrounding the polystyrene pattern was filed with the sand so as to embed the pattern while tamping the sand. The thus formed mold was immediately turned upside down and, after removal of the molding board 24, a predetermined amount of trichloroethylene was poured through the sprue portion of the pattern 22. The pattern 2 was quickly dissolved from the upper side thereof as a result of contact with trichloroethylene. The mold was again turned upside down so that the excess trichloroethylene was removed and was left for 1 hour in the atmosphere whereby the solvent was evaporated and removed.

Figure 28:
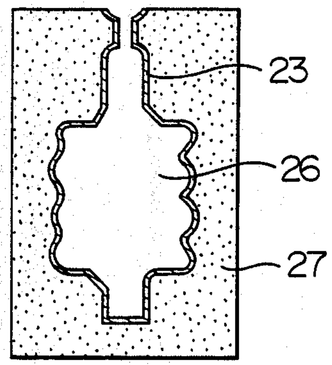
Figure 29:
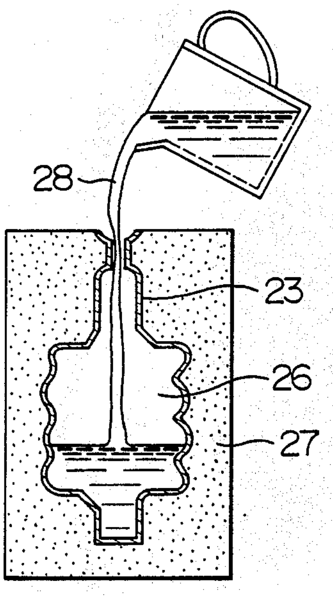

The mold thus formed was irradiated with microwaves for 20 minutes for drying and curing in the same manner as that in the second embodiment. As a result, a mold 27 was formed to have a required mold cavity 26 as shown in FIG. 28.

A zirconia slip was prepared which comprises 80% zirconia powder as a main constituent, which zirconia contains solid solution of $Y_2O_3$, a deflocculation agent, a binder, and distilled water. The slip was poured into the cavity 26 of the mold 27 and the mold was collapsed after elapse of 5 hours, while confirming the hardening of the green body. In order to promote the collapse of the mold, water was sprayed in the same manner as in the second embodiment, so that the mold material could be removed very easily, whereby a zirconia green body with highly smooth surface with no burr and having a high dimensional precision was obtained.

The green body was placed in a firing furnace and was heated up gradually. After heating at 1500° C. for 3 hours, a homogeneous zirconia sintered product was obtained.

(SEVENTH EMBODIMENT)

Figure 30:
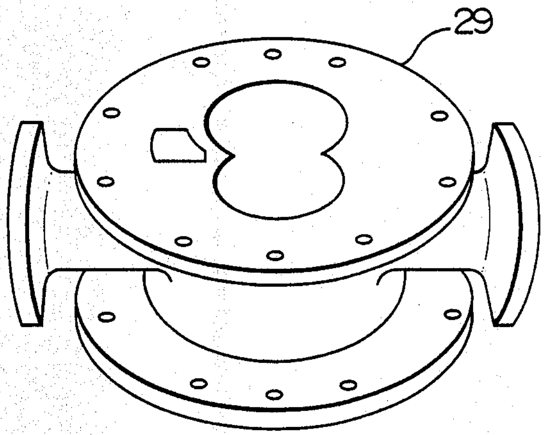

A pattern 29 was formed by use of foamed polystyrene into a shape identical to that of a casing, as shown in FIG. 30. The foaming magnification of the polystyrene was 50 times. Then, water-soluble wax was applied onto the surface of the pattern 29 so as to form a coating 30 of about 70μm in thickness.

Figure 31:
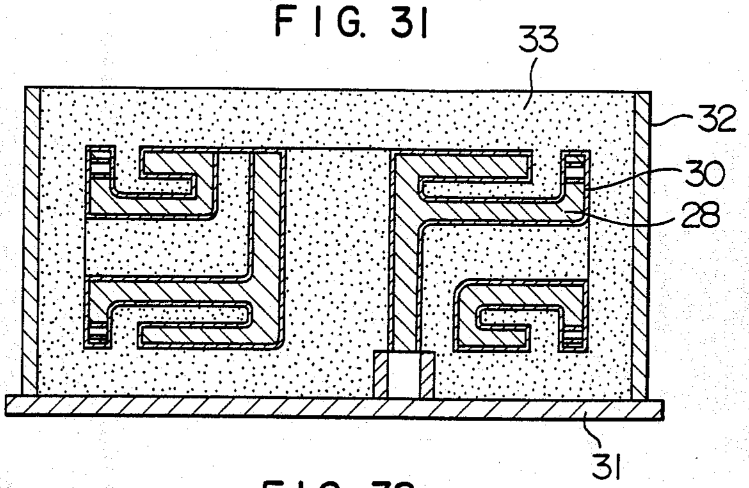

The pattern 29 was placed on a molding board 31 in the manner as shown in FIG. 31, and a split-type metal flash 32 was placed around the pattern 29. A mold material was prepared by kneading 100 parts by weight of alumina (250 to 325 mesh), 12 parts by weight of $K_2CO_3$ and 13 parts by weight of water, and was filled and tamped down around the polystyrene pattern so as to embed the pattern. The thus formed mold was immediately turned upside down and was maintained for 30 minutes in the vapor of trichloroethane after removal of the flask 32 and the molding board 31. The pattern 29 was quickly dissolved and dripped from the upper side thereof as a result of contact with trichloroethane vapor and the drip was discharged to the outside of the mold. Then, the mold was dried and cured in a drying oven at 200° C., An alumina slip was prepared which comprises alumina powder of means particle size of 2.5 μm as a main constituent thereof, a sintering-assisting agent, deflocculation agent, and distilled water. The slip was poured into the cavity of the mold 33 and the mold 33 was placed in the atmosphere for 3 hours. After confirmation of the curing of the green body, water was sprayed onto the water-soluble mold, so that the alumina green body could be removed from the mold very easily.

The green body was placed in a gas furnace and was heated up from room temperature and maintained at 1650° C. for 3 hours followed by slow cooling. As a result, a casing as a complete sintered product of alumina was obtained.

In the embodiments described above, an integrated mold can be obtained without difficulty, so that products having complicated configurations such as a turbocharger casing can be produced by using a one piece mold. As explained before, a conventional casting of articles having complicated configurations has usually required more than 20 mold parts including main mold parts and cores, necessitating an impractical large number of preparation and assembly steps, as well as a high degree of skill and experience. In addition, the quality of the product is impaired due to presence of burrs. The smoothness and the dimensional precision of the conventional product also are inferior to those of the product produced by the mold in accordance with the present invention. The advantageous effect brought about in this embodiment is also applied to the cases of all of the prior embodiments of the invention described above.

(EIGHTH EMBODIMENT)

Figure 32:
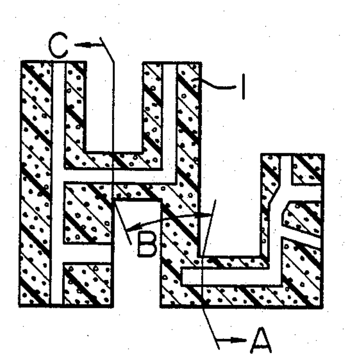
FIG. 32 is an illustration of a pattern having a three-dimensional configuration with many convex and concave portions.

A pattern having a section shown in FIG. 32 encounters difficulty in providing a coating because of its complicated internal configuration, i.e., due to the presence of many convexities and concavities. In such a case, the pattern was previously divided into sections such as sections A, B and C and coating operations were conducted on each of these sections, and then these sections were bonded into an integral pattern. The thus prepared pattern was used in the production of a mold in accordance with any one of the methods of the first to seventh embodiments.

(NINTH EMBODIMENT)

This embodiment is a slip casting method for obtaining a ceramic green body by use of a water collapsible mold obtained through a process similar to that of the first embodiment.

Figure 33:
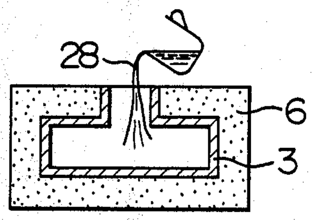
FIGS. 33 to 36 are sectional views of steps beginning from casting of a slip and ending in the formation of a green body in a method in accordance with a ninth embodiment of the invention.
Figure 34:
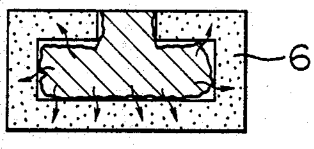
Figure 35:
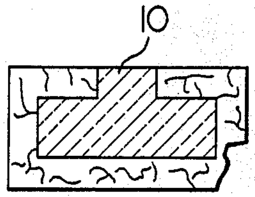
Figure 36:
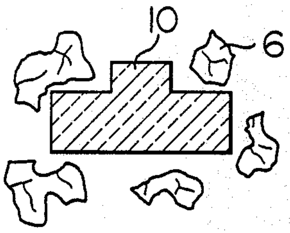

An aqueous solution 9 of the slip was poured into the cavity of the mold 6 as shown in FIG. 33. As a result, the water contained in the slip dissolved the coating 3 and penetrates into the mold, so that the adhesion of the mold was lost as shown in FIG. 34. In consequence, the mold became very easily collapsible as shown in FIG. 35, so that it was collapsed with a small external force, as shown in FIG. 36. Namely, in this embodiment, the coating 3 first prevents the solvent from permeating into the mold during dissolving of the pattern, but the coating 3 is easily dissolved when the slip is cast thereafter, so that both the coating and the mold are readily removed from the green body.

(TENTH EMBODIMENT)

Figure 9:
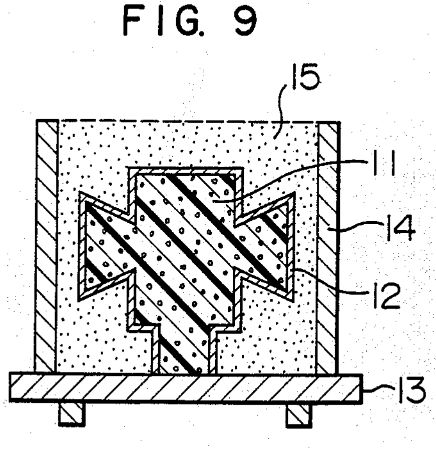

An aqueous solution of 25% polyvinyl alcohol was applied onto the whole surface of the foamed polystyrene test piece 11 (foaming magnification of 40 times) shown in FIG. 8 with the exception of the upper end to thereby form a coating 12 of about 30 μm in thickness. Then the test piece was fixed in the center of a space defined by a wooden flask 14 placed on a molding board 13 as shown in FIG. 9, and a slurry of kneaded mixture of 20 parts by weight of gypsum, 80 parts by weight of silica fine powder (having a grain size of not more than about 300 mesh), and 60 parts by weight of water was poured around the test piece.

After the mold was hardened, the mold was turned upside down, and the board and the wooden flasks were removed as shown in FIG. 10. Then, by pouring trichloroethane from the top (having no coating of polyvinyl alcohol) of the test piece 11, the pattern was gradually dissolved. The trichloroethane in which the pattern was dissolved was discharged outside of the mold, whereby there was obtained a mold cavity on the surface of which no residue was observed. The resultant mold was heated at 400° C. for 3 hours, so that the adhesion of the gypsum was lost with the result that the strength of the mold became not more than about 0.8 Kg/cm$^2$ in compression strength. In addition, the coating 12 disappeared by the heating.

Then, there was poured into the mold cavity 16 a zirconia slip comprising, as a matrix, zirconia powder of 80% having a grain size of not more than 1 μm in which zirconia a solid-solution of $Y_2O_3$ is included, a deflocculation agent, a binder and distilled water, all of which are uniformly mixed. After 5 hours under atmospheric air, the hardening of the green body was confirmed. The mold material was very readily removed, and there was obtained a zirconia green body having no burr, having a smooth surface and superior in dimension accuracy. The green body was then placed in a firing furnace, the temperature of the furnace being gradually raised up to 1500° C., at which temperature the green body was maintained for 3 hours, whereby a uniform complete zirconia sintered body was obtained.

(ELEVENTH EMBODIMENT)

An aqueous solution of 15% polyvinyl pyrrolidone of about 50 μm in thickness was applied onto the whole surface of a male-type rotor pattern 22 for a screw compressor, which pattern was made of forward polystyrene (foaming magnification of 20 times), with the exception of the upper end thereof to thereby form a coating 23 as shown in FIG. 26.

The pattern was placed on a molding board 24 in the same manner as the first embodiment as shown in FIG. 27, and a sprue was bonded by an adhesive to the pattern. The pattern was then surrounded by a wooden flask 25. A space defined between the pattern and the flask 25 was filled with a mold slurry prepared by kneading a mixture comprising 70 parts by weight of alumina (250 to 325 mesh in grain size), 30 parts by weight of gypsum, 8 parts by weight of cellulose powder (not more than 300 mesh in grain size), and 75 parts by weight of water. After hardening the mold, the mold was immediately turned upside down, the molding board being removed, and trichloroethylene was poured through the sprue portion of the pattern to thereby dissolve the pattern 22. The pattern was rapidly dissolved in the trichloroethylene from the upper side to the bottom thereof as a result of contact with the trichloroethylene. The mold was again turned upside down to discharge the solution outside of the mold.

The mold was heated at 400° C. for 3 hours, so that the adhesion of the gypsum was lost with the result that the compression strength of the mold became not more than 0.8 Kg/cm$^2$ while the coating disappeared due to the heating.

Thus, it was possible to obtain a desired mold cavity having a smooth surface without any residue of the pattern and having a high dimensional precision.

Then, there was prepared a $Si_3N_4$ slip comprising $Si_3N_4$ powder of 0.5 μm in mean grain size as a main constituent thereof, deflocculant, and distilled water. The slip was then poured in the mold cavity, a resultant green body being confirmed to be hardened after elapsing two hours therefrom, and thereafter the mold was removed. When effecting the removal of the mold, water was sprayed onto the mold to promote the collapsing of the mold so that the mold material was removed very readily, with the result that there was obtained a green body of $Si_3N_4$ having a smooth surface without any burr and having good dimensional precision.

The green body was placed in a nitriding furnace and was gradually heated to 1850° C., at which temperature it was maintained for 2 hours, and the green body was gradually cooled. Thus, there was obtained a turbocharger casing 21 of a complete $Si_3N_4$ sintered product having a high density as shown in FIG. 25.

As has been described, according to the invention, it is easily possible to form an integrated mold which is capable of molding an article having a complicated internal and/or external configuration by slip casting, thus making it unnecessary to prepare and to assemble a number of mold parts and cores which are necessary in the conventional processes.

The present invention also bring about the following additional advantages:

(1) It is possible to obtain a mold having a old cavity with a cavity wall surface having no dissolved residue at all.

(2) It is possible to completely prevent the occurrence of cracking in the green body such as core-constraint cracking due to drying and contraction.

These additional advantages (1) and (2) in turn enable articles of complicated shapes to be cast easily without causing any burr.

What is claimed is:

1. A method of producing a mold having a cavity for slip casting comprising the steps of:

preparing a pattern made of an organic material soluble in a predetermined solvent A;

providing a coating on at least a portion of the surface of said pattern, which coating is made of material soluble in another predetermined solvent B, wherein said solvent B is at least one material selected from the group consisting of water, alcohol, and acetone, but insoluble in said solvent A;

surrounding said pattern and said coating with a molding material;

contacting said pattern with said solvent A so as to contract said pattern; and removing the material of said pattern to the outside of said molding material; thereby forming a mold cavity;

wherein said mold material contains a binder soluble in said solvent B.

2. A method of producing a mold for slip casting comprising the steps of: preparing a pattern made of an organic material soluble in a predetermined organic solvent; forming a coating on at least a portion of the surface of said pattern, which coating is made of a material soluble in water, but insoluble in said organic solvent; surrounding said pattern and said coating with a molding material, said molding material containing a binder soluble in water; contacting said pattern with said organic solvent so as to contract said mold pattern; and removing the pattern to the outside of said molding material, thereby forming a mold cavity.

3. A method of producing a mold according to claim 2, wherein said pattern is formed of a foamed resin which is soluble in said organic solvent.

4. A method of producing a mold according to claim 3, wherein said foamed resin is selected from the group consisting of foamed polystyrene, foamed polyethylene, and p-dichlorobenzene.

5. A method of producing a mold according to claim 3, wherein said organic solvent is at least one material selected from the group consisting of trichloroethane, trichloroethylene, tetrachloroethylene, and ethyl acetate.

6. A method of producing a mold according to claim 2, wherein said water soluble binder is an inorganic binder.

7. A method of producing a mold according to claim 6, wherein said inorganic water-soluble binder is an aqueous solution of at least one inorganic material selected from the group consisting of sodium carbonate, potassium carbonate, sodium chloride, potassium chloride, magnesium chloride, lithium chloride, trisodium phosphate, tripotassium phosphate, dipotassium hydrogen phosphate, magnesium sulfate, potassium sulfate, sodium sulfate, aluminum sulfate, and ammonium sulfate.

8. A method of producing a mold according to claim 2, wherein said water-soluble binder is an organic binder.

9. A method of producing a mold according to claim 8, wherein said organic water-soluble binder is an aqueous solution of at least one organic material selected from the group consisting of polyvinyl alcohol, water-soluble isobutane-maleic anhydride copolymer, polyacrylamide, polyethylene oxide, polyvinyl pyrrolidone, water-soluble vinyl acetate copolymer, acrylic copolymer, polyethylene glycol, methyl cellulose, carboxy methylcellulose, hydroxypropyl cellulose, water-soluble was, starch, glue, and gum arabic.

10. A method of producing a mold according to claim 8, wherein said organic water-soluble binder is at least one of an aqueous solution of polyvinyl alcohol, and an alcohol solution of polyvinyl alcohol.

11. A method of producing a mold according to claim 2, wherein said coating is formed of an aqueous solution of at least one organic material selected from the group consisting of polyvinyl alcohol, water-soluble isobutane-maleic anhydride copolymer, polyacrylamide, polyethylene oxide, polyvinyl pyrrolidone, water-soluble vinyl acetate copolymer, acrylic copolymer, polyethylene glycol, methyl cellulose, carboxy methylcellulose, hydroxypropyl cellulose, water-soluble wax, starch, glue, and gum arabic.

12. A method of producing a mold according to claim 2, wherein said water-soluble binder is at least one of an aqueous solution of polyvinyl alcohol, and an alcohol solution of polyvinyl alcohol.

13. A method of producing a mold according to claim 2, wherein said organic solvent dissolves said pattern.

14. A method of producing a mold for slip casting comprising the steps of:

preparing a pattern of a female mold, which pattern is made of an organic material soluble in a predetermined solvent A;

providing a coating on at least a portion of the internal surface of said female mold pattern, which coating is made of a material soluble in another predetermined solvent B, wherein said solvent B is at least one material selected from the group consisting of water, alcohol, and acetone, but insoluble in said solvent A;

filling an inner portion of said pattern with a molding material;

contacting said pattern with said solvent A so as to contact said pattern; and removing the material of said pattern to thereby form a male mold;

wherein said mold material contains a binder soluble in said solvent B.

15. A slip casting method comprising the steps of: preparing a pattern made of an organic material soluble in a predetermined organic solvent; providing a coating on at least a portion of the surface of said pattern, which coating is made of a material soluble in water, but insoluble in and impermeable to said organic solvent; surrounding said pattern and said coating with a mold material, said mold material containing a binder soluble to water; contacting said pattern with said organic solvent so as to contract said pattern; removing the material of said pattern to the outside of said mold the thereby form a mold cavity; supplying a slip containing water so that said slip is solidified while dissolving said coating and making said mold material easily collapsible; and extracting slip-cast product while collapsing and removing said mold material.

16. A slip casting method according to claim 15, wherein said pattern is formed of a foamed resin soluble in said organic solvent.

17. A slip casting method according to claim 16, wherein said foamed resin is selected from the group consisting of foamed polystyrene, foamed polyethylene, and p-dichlorobenzene.

18. A slip casting method according to claim 15, wherein said organic solvent is at least one material selected from the group consisting of trichloroethane, trichloroethylene, tetrachloroethylene, and ethyl acetate.

19. A slip casting method according to claim 15, wherein said water soluble binder is an inorganic binder.

20. A slip casting method according to claim 19, wherein said inorganic water-soluble binder is an aqueous solution of at least one inorganic material selected form the group consisting of sodium carbonate, potassium carbonate, sodium chloride, potassium chloride, magnesium chloride, lithium chloride, trisodium phosphate, tripotassium phosphate, dipotassium hydrogen phosphate, magnesium sulfate, potassium sulfate, sodium sulfate, aluminum sulfate, and ammonium sulfate.

21. A slip casting method according to claim 15, wherein said water-soluble binder is an organic binder.

22. A slip casting method according to claim 21, wherein said organic water-soluble binder is an aqueous solution of at least one organic material selected from the group consisting of polyvinyl alcohol, water-soluble isobutane-maleic anhydride copolymer, polyacrylamide, polyethylene oxide, polyvinyl pyrrolidone, water-soluble vinyl acetate copolymer, acrylic copolymer, polyethylene glycol, methyl cellulose, carboxy methylcellulose, hydroxypropyl cellulose, water-soluble wax, starch, glue, and gum arabic.

23. A slip casting method according to claim 21, wherein said organic water-soluble binder is at least one of an aqueous solution of polyvinyl alcohol, and an alcohol solution of polyvinyl alcohol.

24. A slip casting method according to claim 15, wherein said coating is formed by use of an aqueous solution of at least one organic material selected from the group consisting of polyvinyl alcohol, water-soluble isobutane-maleic anhydride copolymer, polyacrylamide, polyethylene oxide, polyvinyl pyrrolidone, water-soluble vinyl acetate copolymer, acrylic copolymer, polyethylene glycol, methyl cellulose, carboxy methylcellulose, hydroxypropyl cellulose, water-soluble wax, starch, glue, and gum arabic.

25. A slip casting method according to claim 15, wherein said water-soluble binder is at least one of an aqueous solution of polyvinyl alcohol, and an alcohol solution of polyvinyl alcohol.

26. A slip casting method according to claim 15, wherein said organic solvent dissolves said pattern.

27. A method of producing a mold for slip casting, comprising the steps of: preparing a pattern made of an organic material soluble in a predetermined solvent A; providing a coating on at least a portion of the surface of said pattern, which coating is made of a material soluble in water, but insoluble in the solvent A; surrounding said pattern and said coating with a mold material so as to form a mold, said mold material being a slurry containing inorganic powder as an aggregate, gypsum as a binder, and water; contacting said pattern with said solvent A after hardening of said molding material so as to contract said pattern; and removing said pattern to the outside of said molding material to thereby form a mold cavity.

28. A slip casting method comprising the steps of casting a slip in a mold cavity of a mold set forth in claim 27, solidifying the slip, and thereafter collapsing and removing a mold material.

29. A method of producing a mold according to claim 27, wherein said solvent A dissolves said pattern.

* * * * *